United States Patent [19]
Hopkins et al.

[11] Patent Number: 5,735,947
[45] Date of Patent: Apr. 7, 1998

[54] CEMENT WITH AIR-COOLED SLAG AND SILICA FUME

[75] Inventors: Donald Stephen Hopkins, Thornhill; David Bridson Oates, Kettleby, both of Canada

[73] Assignee: Lafarge Canada Inc., Canada

[21] Appl. No.: 840,098

[22] Filed: Apr. 11, 1997

Related U.S. Application Data

[63] Continuation of Ser. No. 532,161, Sep. 22, 1995, abandoned.

[51] Int. Cl.$^6$ ............................................. C04B 7/14
[52] U.S. Cl. ......................... 106/714; 106/737; 106/789
[58] Field of Search ................................ 106/714, 721, 106/737, 789

[56] References Cited

U.S. PATENT DOCUMENTS 5,306,344  4/1994  Gutmann et al. .................... 106/714
5,466,289  11/1995  Yanezawa et al. .................. 106/726

FOREIGN PATENT DOCUMENTS 1333358  5/1990  Japan.
0157115  6/1994  Japan.

*Primary Examiner*—Paul Marcantoni
*Attorney, Agent, or Firm*—Bachman & LaPointe, P.C.

[57] ABSTRACT

A cement mix based on an inorganic hydraulic cement, for example, Portland Cement, an air-cooled blast furnace slag and silica fume produces concretes having strength characteristics superior to those achieved by the cement alone; furthermore this cement mix is superior to a corresponding mix based on the inorganic hydraulic cement, and the air-cooled slag without the silica fume, and to a corresponding mix based on the cement and silica fume without the slag; additionally a cost saving in the expensive Portland Cement is achieved by use of the air-cooled slag which is a waste material and cheaper than granulated or pelletized slag.

16 Claims, No Drawings

CEMENT WITH AIR-COOLED SLAG AND SILICA FUME

This is a Continuation, of application Ser. No. 08/532,161 filed Sep. 22, 1995, now abandoned.

BACKGROUND OF THE INVENTION a) Field of the Invention

This invention relates to a cement mix, a cementitious mixture containing the cement mix, concrete and mortar mixes containing the cementitious mixture and solidified concretes and mortars.

b) Brief Description of Prior Art

Cement compositions are typically based on inorganic hydraulic cements such as Portland Cement. In use they are mixed with water and mineral aggregates.

It is common practice to replace a portion of the Portland Cement with man-made pozzolanic materials, for example, fly ash, a by-product of the burning of coal and ground, granulated or pelletized slag, a by-product of blast furnace slag in the steel industry. Silica fume from the silicon and ferrosilicon industry has also been used in cements, however, it tends to increase the stiffness of concretes in which the cement is employed, thereby reducing the workability.

Blast furnace slags which have been employed are, in particular, water-cooled slags obtained by rapid quenching of the molten slag with relatively large quantities of water. Such water-cooled slags have a high degree of vitrification, exhibiting a content of amorphous glass in excess of 90%, by weight. The general wisdom in the concrete art is that the high glass content is essential to the performance of the concrete. This high degree of vitrification is considered a fundamental parameter of acceptability by current standards in the cement industry. Such water-cooled slags have a high slag activity index determined by ASTM C989 and are thus recognized as cementitious materials which may replace a portion of expensive Portland Cement.

Air-cooled blast furnace slags, on the other hand, have a low degree of vitrification, usually less than 50% and typically less than 30%, by weight, glass content and display an unacceptable slag activity index by ASTM C989. As such they have generally been considered as being unsuitable replacements for Portland Cement.

U.S. Pat. No. 3,582,377 describes air-cooled blast furnace slags as having been considered to have no cement properties but does describe their use in a high pressure steam setting composition. The U.S. Patent explains that their utility arises from the use of high pressure steam setting.

U.S. Pat. No. 4,047,961 describes some air-cooled slag as being useful as an intergrind with cement clinker, these slags have a glass content of less than 50%, by weight, and it is indicated that the glass content may even be less than 25%; these slags also have a relatively high content of $Fe_2O_3$ of the order of 4%, by weight. The intergrind in one case was to a Blaine fineness of 3370 $cm^2/g$ and in another case to 4100 $cm^2/g$. The Patent acknowledges that other air-cooled slags do not perform as well as the particular ones described and suggests that the effectiveness of those described arises from the particular composition and accompanying physical characteristics, including particle size distribution. In all cases the air-cooled slag is interground with the cement clinker and other additives and there is no suggestion of grinding the air-cooled slag alone.

Since air cooled slag is harder to grind than Portland cement, the intergrind in the U.S. Patent would be expected to have cement particles much finer than the slag particles. Indeed it is probable that the results achieved with the intergrind in the U.S. Patent arise from a high degree of fineness of the cement particles, rather than the presence of the slag, since it is well known that higher surface area and smaller particle size of cement particles improves characteristics of the cement. Thus the comparison in Examples 1 and 2 of the U.S. Patent between normal cement and the intergrind of comparable Blaine fineness is not a fair comparison since the cement particles of the intergrind would be finer than those of the normal cement.

SUMMARY OF THE INVENTION

It is an object of this invention to provide a cement mix which utilizes an otherwise waste material to replace a part of the inorganic hydraulic cement.

It is a further object of this invention to provide a cementitious mix of improved theology, containing the cement mix.

It is a still further object of this invention to provide a solidifiable mix, especially a concrete or mortar containing the cement mix.

In accordance with one aspect of the invention there is provided a Cement mix comprising, in weight %, to a total of 100%, i) 28% to 93% of a particulate inorganic, hydraulic cement; ii) 5% to 60% of an air-cooled blast furnace slag having a glass content below 70%, by weight, of the slag; and iii) 2% to 12% of silica fume.

In accordance with another aspect of the invention there is provided a cementitious mixture comprising water and a cement mix of the invention.

In accordance with still another aspect of the invention there is provided a solidifiable mix comprising water, mineral aggregate and a cement mix of the invention.

Surprisingly, in the present invention it is found that while replacement of a portion of a hydraulic cement with particulate air-cooled slag results in significant loss of strength in concrete, replacement of a corresponding portion of hydraulic cement with the air-cooled slag in a cement which contains silica fume does not result in any significant loss in strength, but does produce a desirable improvement in rheology.

The combined use of both air-cooled slag and silica fume as partial replacement for a hydraulic cement thus provides properties in the concrete which are not predictable from results achieved by inclusion of air-cooled slag alone or silica fume alone as partial replacement for a hydraulic cement.

DESCRIPTION OF PREFERRED EMBODIMENTS i) Cement Mix

The cement mix of the invention comprises, in weight %, to a total of 100%; 28% to 93%, preferably 62% to 86%, of a particulate inorganic hydraulic cement; 5% to 60%, preferably 10% to 30% of an air-cooled blast furnace slag; and 2% to 12%, preferably 4% to 8% silica fume.

a) Hydraulic Cement

The inorganic hydraulic cement is, in particular a Portland Cement which typically has an average particle size of about 10 μm, and a Blaine fineness of 3500 $cm^2/g$ to 4000 $cm^2/g$.

b) Air-cooled Blast Furnace Slag

The air-cooled blast furnace slags suitable for use in the invention have a glass content below 70%, by weight, and suitably have a low degree of vitrification, corresponding to a glass content of 5% to 20%, by weight. This distinguishes the air-cooled slags from the corresponding water-cooled slags which typically have a glass content above 90%, by weight.

Water-cooled slags are produced by rapidly cooling the molten slag in a large quantity of water; this results in a highly amorphous glass structure.

Air-cooled slags are produced by allowing the molten slag to cool slowly in a random, uncontrolled fashion. This cooling may be aided by water, but such water is in a relatively low amount; this results in a highly crystalline structure.

The air-cooled slags employed in the invention are ground to a Blaine fineness of 5,000 to 5,500 cm²/g.

Typically the air-cooled slags have a slag activity index by ASTM C989 of 40 to 50 at 7 days, and 50 to 60 at 28 days and are thus considered low grade slags not even meeting grade 80 of ASTM C989.

By comparison water-cooled blast furnace slags of similar composition and Blaine fineness satisfy grade 120 of ASTM C989.

The air-cooled slags suitably have a particle size distribution when ground such that at least 85% pass a 45 μm screen, at least 45% pass a 10 μm screen and at least 5% pass a 2 μm screen, with the fine particle sizes being 1 to 2 μm in diameter.

c) Silica Fume

Silica fume is a by-product in the production of silicon or ferro-silicon alloys and is collected by filtration of gases escaping the electric-arc furnace. Typically it has a silicon dioxide content of at least 7.5%, by weight, and consists of fine, spherical particles having an average diameter of about 0.1 μm.

ii) Cementitious and Solidifiable Compositions

The cement mix of the invention forms a cementitious mixture when admixed with water.

Suitably the weight ratio of water to cement mix is 0.4 to 0.5:1, preferably about 0.45:1. Low ratios of this type may particularly be achieved by use of a water reducer, for example, calcium lignosulfonate and other water soluble lignin derivatives.

When mixed with mineral aggregate the cementitious composition forms a solidifiable composition in which the cementitious composition forms a binder matrix for the aggregate.

Such solidifiable compositions are classified as concretes or mortars, depending on the particle size of the aggregate.

Concretes usually contain both coarse and fine aggregates whereas mortars contain fine aggregate but no coarse aggregate.

The proportions of coarse and fine aggregate used in a concrete depend on the required properties and intended use.

Aggregates for use in concrete are described in ASTM C33-90 "Standard Specification for Concrete Aggregates", which is incorporated herein by reference.

In general coarse aggregates fall within the range of 2 inches to ⅓ inch mesh; and fine aggregate falls in the range of No. 4 mesh to No. 200 mesh of ASTM C-11.

Coarse aggregates include gravel and crushed limestone; fine aggregates include sand.

Concretes suitably have a content of the cement mix of 250–500 kg/m³; mortars suitably have a content of the cement mix of 300–700 kg/m³.

EXPERIMENTAL

Two water-cooled blast furnace slags and two air-cooled blast furnace slags were employed in cementitious compositions based on Portland Cement for concretes.

In addition ternary mixes of Portland Cement, air-cooled slag and silica fume were tested.

The water-cooled slags are identified as Standard and Tampa; the air-cooled slags are identified as National and Vulcan.

These are not proprietary names.

Standard was obtained from Standard Industries of Hamilton, Ontario. Tampa was obtained from a source in Tampa, but originated in Italy. National was obtained from National Slag of Hamilton, Ontario and Vulcan was obtained from Vulcan Materials Co. of Fairfield, Ala.

Chemical and physical characteristics of the four slags were determined. The pozzolanic activity index was performed according to ASTM C989. St-Constant Type I-II (Portland Cement) was used as the control and, Standard slag as a reference. Results are presented in Table 1.

The performance of these slags was also evaluated in concrete. Seven and 28 day compressive strengths were measured as well as slump, air content and unit weight of fresh concrete. The cementitious content was 380 kg/m³ and the slags replaced 20% of the Portland Cement. National air-cooled slag was also tested in a ternary blend with 4 to 8% of silica fume. Also, to isolate the effect of this last slag, two mixes were added to the test program. One with a 4% silica fume replacing Portland Cement and the other with 8%, both without slag.

A fixed W/(C+S) ratio of 0.45:1 was used. A water reducer was also used, which was 25XL at a dosage of 250 ml/100 kg of cementitious. No air entraining agent was used.

The following formulations were used with the, different slags.

| Materials | kg/m³ |
|---|---|
| Cementitious | 380 |
| Coarse aggregates | 1050 |
| Sand | 815 |
| Water | 171 |
| W/(C + S) | 0.45 |
| Water reducer (25 × L) | 250 ml/100 kg | in which
W = water
C = cement
S = slag.

TABLE 1

Chemical and physical characteristics of four slags

| | Tampa | Vulcan | National | Standard | Limits ASTM C989 |
|---|---|---|---|---|---|
| Chemical analysis | | | | | |
| SiO₂ | 38.3 | 38.2 | 36.9 | 35.4 | |
| Al₂O₃ | 7.9 | 10.8 | 10.0 | 10.2 | |
| Fe₂O₃ | 0.4 | 0.5 | 0.4 | 0.4 | |
| CaO | 38.3 | 37.2 | 35.1 | 33.5 | |
| MgO | 10.9 | 10.4 | 13.6 | 15.1 | |
| Na₂O | 0.27 | 0.3 | 0.32 | 0.4 | |
| K₂O | 0.33 | 0.33 | 0.34 | 0.47 | |
| SO3 | 2.9 | 2.15 | 2.8 | 3.85 | 4.0 |
| S | 1.1 | 0.8 | 1.0 | 1.5 | 2.5 |
| LOI | +0.6 | +0.9 | +0.9 | +2.1 | |

TABLE 1-continued

Chemical and physical characteristics of four slags

|  | Tampa | Vulcan | National | Standard | Limits ASTM C989 |
|---|---|---|---|---|---|
| Total | 98.7 | 99.6 | 99.2 | 99.1 |  |
| Glass content[1] (%) | 95 | 15 | 10 | 94 |  |
| Physical analysis |  |  |  |  |  |
| Blaine (m²/kg) | 620 | 530 | 520 | 460 |  |
| Specific gravity | 2.88 | 2.98 | 2.98 | 2.91 |  |
| Particle size distribut. % passing |  |  |  |  |  |
| 45 μm | 91 | 91 | 90 | 99 |  |
| 10 μm | 50 | 50 | 50 | 53 |  |
| 2 μm | 7 | 7 | 10 | 4 |  |
| Slag activity index 7d | 90 | 46 | 45 | 70 | note (2) |
| (%) 28d | 125 | 54 | 56 | 112 | note (3) |

Notes
[1] By CSA-A363-M88
(2) By ASTM C989: Grade 100, min = 70% Grade 120, min = 90%
(3) By ASTM C989: Grade 80, min = 70% Grade 100, min = 90% Grade 120, min = 110%

The chemical compositions of the four slags are comparable. They all satisfy the S and $SO_3$ maximum level required by ASTM C989. However, there is a significant difference in the glass contents. Both air cooled slags (Vulcan and National) have a very low level of glass content, 15 and 10% respectively. While Tampa and Standard slags have glass contents of 95 and 94%, respectively. This is reflected in the slag activity index. At 28 days the Tampa and Standard slags met the grade 120 of ASTM C989, while the two air-cooled slags did not even meet the lower grade 80 which requires a slag activity index of 70%.

The particle size distribution of the four samples is comparable. The water demand does not vary.

The addition of the slags increased the concrete slumps by as much as 58% as compared to the control. The air content was not affected by the addition of slag, it varied from 1.9% to 2.1%.

The results of the concrete testing are set out in Table 2.

TABLE 2

Summary of the concrete testing program

| MATERIALS (kg/m3) | SOURCE/ TYPE | CONTROL MIX-1 C-953 | STANDARD SLAG Stoney Creek 20% MIX-2 C-956 | NATIONAL AIR COOLED 20% MIX-3 C-957 | VULCAN AIR COOLED FAIRFIELD 20% MIX-4 C-954 | TAMPA SLAG 20% MIX-5 C-955 | NATIONAL AIR COOLED 20% + 4% SKW Bécancour MIX-6 C-959 | NATIONAL AIR COOLED 20% + 8% SKW Bécancour MIX-7 C-967 | SKW SF 4% MIX-8 C-977 | SKW SF 8% MIX-9 C-981 |
|---|---|---|---|---|---|---|---|---|---|---|
| MIX DESIGNS |  |  |  |  |  |  |  |  |  |  |
| WATER |  | 172 | 171 | 172 | 172 | 171 | 172 | 172 | 174 | 174 |
| CEMENT | St-Constant T20 | 381 | 304 | 305 | 306 | 305 | 290 | 275 | 370 | 355 |
| SAND | St-Gabriel (cts) | 817 | 810 | 812 | 815 | 812 | 814 | 812 | 825 | 825 |
| STONE | Lagacé (cts) | 1053 | 1050 | 1053 | 1056 | 1054 | 1056 | 1053 | 1053 | 1053 |
| CEMENT ADDITIVES |  |  |  |  |  |  |  |  |  |  |
| SLAG | Standard Slag (Stoney Creek) |  | 76 |  |  |  |  |  |  |  |
|  | National (air cooled) |  |  | 76 |  |  | 76 | 76 |  |  |
|  | Vulcan (air cooled-Fairfield) |  |  |  | 76 |  |  |  |  |  |
|  | Tampa Slag |  |  |  |  | 76 |  |  |  |  |
| SILICA FUME | SKW - Bécanour |  |  |  |  |  | 15 | 30 | 15 | 30 |
| Water reducer (ml/100 kg) | 25XL | 250 | 250 | 250 | 250 | 250 | 250 | 250 | 250 | 250 |
| Water/ Cementitious |  | 0.45 | 0.45 | 0.45 | 0.45 | 0.45 | 0.45 | 0.45 | 0.45 | 0.45 |

TABLE 2-continued

Summary of the concrete testing program

| MATERIALS (kg/m3) | SOURCE/ TYPE | CON- TROL MIX-1 C-953 | STAND- ARD SLAG Stoney Creek 20% MIX-2 C-956 | NATIONAL AIR COOLED 20% MIX-3 C-957 | VULCAN AIR COOLED FAIRFIELD 20% MIX-4 C-954 | TAMPA SLAG 20% MIX-5 C-955 | NATIONAL AIR COOLED 20% + 4% SKW Bécancour MIX-6 C-959 | NATIONAL AIR COOLED 20% + 8% SKW Bécancour MIX-7 C-967 | SKW SF 4% MIX-8 C-977 | SKW SF 8% MIX-9 C-981 |
|---|---|---|---|---|---|---|---|---|---|---|
| PROPERTIES OF FRESH CONCRETE | | | | | | | | | | |
| SLUMP (mm) | | 85 | 130 | 135 | 100 | 105 | 90 | 80 | 50 | 40 |
| AIR CONTENT (%) | | 2.0 | 2.1 | 2.1 | 1.9 | 2.0 | 2.0 | 2.0 | 2.1 | 2.7 |
| UNIT WEIGHT (kg/m3) | | 2424 | 2412 | 2419 | 2426 | 2419 | 2424 | 2419 | 2398 | 2398 |
| COMPRESSIVE STRENGTHS | | | | | | | | | | |
| Compressive strength (MPa) | 7 d | 37.0 | 36.0 | 31.3 | 32.2 | 38.9 | 34.0 | 35.4 | 38.2 | 42.7 |
| | 28 d | 46.4 | 51.1 | 42.5 | 43.3 | 51.4 | 50.0 | 53.6 | 50.3 | 55.1 |

National and Vulcan air-cooled slags, while improving the rheological behavior, showed decreased strengths at 7 days and 28 days. In fact, they were 7% and 8% lower than the control at 28 days. This is probably due to their low amorphous glass content since all other parameters are comparable.

Silica fume alone, in the cement, produced an increase in strength but a significant decrease in concrete slump below acceptable levels.

Replacement of a portion of the cement with air-cooled slag in the mix of cement and silica fume, surprisingly, increased the concrete slump to acceptable levels without significant loss of the increase in strength attained by inclusion of the silica fume; and the strength remained greater markedly superior to that achieved with the control. These results are totally unexpected and unpredictable.

The results also demonstrate that the combined use of air-cooled slag and silica fume, achieved strength development higher than the control at 28 days. With an addition of 4% of silica fume, the 28 day strength was marginally lower than that of the two water-cooled slags. With an addition of 8% of silica fume the strength was higher than both the control and that of the two water-cooled slags.

The results summarized in Table 2, show that while the use of air-cooled slags produced compressive strengths in concrete markedly inferior to the strengths achieved by the control and the concretes containing water-cooled slags, and that while the use of silica fume alone produces a marked increase in compressive strengths with a significant unacceptable lowering of the concrete slump, the replacement of a portion of the cement in a mix of cement and silica fume, with air-cooled slag restored the slump to acceptable levels comparable to those of the control, while maintaining the increased strength parameter. Thus superior results in strength and rheology were achieved when the air-cooled slag was employed in conjunction with silica fume.

Table 3 shows relative strengths of the samples at 7 and 28 day strengths using Standard slag gave results of 97% and 110% of the control's strengths. Tampa slag obtained 105 and 111% respectively. However, the two air-cooled slags achieved lower strengths at both 7 and 28 days. National slag (Mix-3) showed 85% to 92% of the control strengths and Vulcan slag (Mix-4) achieved 87% and 93%, respectively.

Performance was tested on ternary blend mixes containing silica fume. The two mixes contained 4% silica fume and 20% National slag (Mix-6) and 8% silica fume and 20% National slag (Mix-7) for 24 and 28% replacement of the cement. Mix-6 showed 92% of the control's strength at 7 days and 108% at 28 days, while Mix-7 showed values of 96% and 116%.

In order to isolate the effect of the slag in those last mixes, two more mixes were tested containing 5 and 8% silica fume only (Mix-8 and 9). The 7 day strengths gave 103% and 115% of the control, the strengths gave 108% and 119% of the control.

TABLE 3

Relative strengths

| | | Relative strengths in % of control mix | |
|---|---|---|---|
| Mix description | Mix # | 7 days | 28 days |
| Control | 1 | 100 | 100 |
| Standard slag 20% | 2 | 97 | 110 |
| National slag 20% | 3 | 85 | 92 |
| Vulcan slag 20% | 4 | 87 | 93 |
| Tampa slag 20% | 5 | 105 | 111 |
| National 20% + Skw SF 4% | 6 | 92 | 108 |
| National 20% + Skw SF 8% | 7 | 96 | 116 |
| SKW SF 4% | 8 | 103 | 108 |
| SKW SF 8% | 9 | 115 | 119 |

Thus, in accordance with the invention it is possible to employ a waste material, air-cooled blast furnace slag as a partial replacement for Portland Cement, by additionally incorporating in the cement a small amount of silica fume. The use of air-cooled blast furnace slag alone as a partial replacement for Portland Cement produces inferior strength results as compared with the control (Portland Cement) or cements based on Portland Cement and water-cooled slags. The use of silica fume alone as a partial replacement for Portland Cement improves the strength but the rheological properties are inferior and below acceptable standards as compared with the control (Portland Cement) or cements based on Portland Cement and water-cooled slags.

When air-cooled slags were employed as the lone replacement, inferior compressive strengths were achieved.

When silica fume was employed as the lone replacement unacceptable slumps resulted indicating inferior rheological characteristics.

By employing both air-cooled slag and silica fume as replacements for part of the Portland Cement, superior results were obtained.

The two basic requirements of all concretes are adequate strength, or structural integrity and acceptable rheology for forming the intended shape.

Silica fume additions to cement improve strength but stiffens the concrete and thus provide poor rheology. Expensive super plasticizers are often used to avoid increasing water content to counteract inferior rheology characteristics.

The results show that the strengths of the silica fume cement concrete is maintained even with the substitution of 20% air-cooled slag and reduction on the cement component to 72% and 76%. The mixture has the further benefit of improved rheology for typical commercial applications where slumps of 90 mm are normal.

Thus in accordance with the invention it is possible to replace part of the expensive Portland Cement with a waste material, air-cooled blast furnace slag and silica fume, and achieve strengths superior to Portland Cement alone.

We claim:

1. A hydraulic cement mix in which a portion of the hydraulic cement is replaced by a combination of an air-cooled blast furnace slag having a glass content below 70%, by weight, of the slag, and a silica fume, such that said cement mix has a composition comprising, in weight %, to a total of 100%,
   i) 28% to 93% of a particulate inorganic, hydraulic cement;
   ii) 5% to 60% of an air-cooled blast furnace slag having a glass content below 70%, by weight, of the slag; and
   iii) 2% to 12% of silica fume, said combination of air-cooled blast furnace slag and silica fume restoring loss of strength resulting from replacement of said hydraulic cement with said air-cooled blast furnace slag alone, and restoring slump lost by replacement of said hydraulic cement with said silica fume alone.

2. A mix according to claim 1, wherein said air-cooled blast furnace slag has a glass content of 5% to 20%, by weight, of the slag.

3. A mix according to claim 2, comprising: 62 to 86% of said cement i), 10 to 30% of said slag ii) and 4 to 8% of said silica fume to a total of 100%.

4. A cement mix according to claim 3, wherein said slag is ground to a fineness of 5,000 to 5,500 cm²/g.

5. A cement mix according to claim 4, wherein said hydraulic cement is Portland Cement.

6. A cementitious mixture consisting essentially of:
   a) a hydraulic cement mix in which a portion of the hydraulic cement is replaced by a combination of an air cooled blast furnace slag having a glass content below 70%, by weight, of the slag, and a silica fume, such that said cement mix has a composition comprising, in weight %, to a total of 100%,
      i) 28% to 93% of a particulate, inorganic hydraulic cement;
      ii) 5% to 60% of an air-cooled blast furnace slag having a glass content below 70%, by weight, of the slag; and
      iii) 2% to 12% of silica fume, and
   b) water, said combination of air-cooled blast furnace slag and silica fume restoring loss of strength resulting from replacement of said hydraulic cement with said air-cooled blast furnace slag alone, and restoring slump lost by replacement of said hydraulic cement with said silica fume alone.

7. A mixture according to claim 6, wherein said air-cooled blast furnace slag has a glass content of 5 to 20%, by weight, of the slag.

8. A mixture according to claim 7, comprising 62 to 86% of said cement i), 10 to 30% of said slag ii) and 4 to 8% of said silica fume to a total of 100%.

9. A mixture according to claim 8, wherein said slag is ground to a fineness of 5,000 to 5,500 cm²/g.

10. A mixture according to claim 9, wherein said hydraulic cement is Portland Cement.

11. A solidifiable mix consisting essentially of:
    a) a cement mix in which a portion of the hydraulic cement is replaced by a combination of an air-cooled blast furnace slag having a glass content below 70%, by weight, of the slag, and a silica fume, such that said cement mix has a composition comprising, in weight %, to a total of 100%,
       i) 28% to 93% of a particulate inorganic, hydraulic cement;
       ii) 5% to 60% of an air-cooled blast furnace slag having a glass content below 70%, by weight, of the slag; and
       iii) 2% to 12% of silica fume; and
    b) water, and
    c) mineral aggregate, said combination of air-cooled blast furnace slag and silica fume restoring loss of strength resulting from replacement of said hydraulic cement with said air-cooled blast furnace slag alone, and restoring slump lost by replacement of said hydraulic cement with said silica fume alone.

12. A mix according to claim 11, wherein said air-cooled blast furnace slag has a glass content of 5 to 20%, by weight, of the slag.

13. A mix according to claim 12, comprising 62 to 86% of said cement i), 10 to 30% of said slag ii) and 4 to 8% of said silica fume to a total of 100%.

14. A mix according to claim 13, wherein said slag is ground to a fineness of 5,000 to 5,500 cm²/g.

15. A mix according to claim 14, wherein said hydraulic cement is Portland Cement.

16. A mix according to claim 11, wherein said mineral aggregate comprises coarse aggregate.

* * * * *